(12) United States Patent
Ward et al.

(10) Patent No.: US 7,636,062 B2
(45) Date of Patent: Dec. 22, 2009

(54) LOCATION DEVICE AND SYSTEM USING UWB AND NON-UWB SIGNALS

(75) Inventors: Andrew Martin Robert Ward, Great Shelford (GB); Paul Michael Webster, Trumpington (GB)

(73) Assignee: Ubisense Limited, Chesterton (GB)

( * ) Notice: Subject to any disclaimer, the term of this patent is extended or adjusted under 35 U.S.C. 154(b) by 162 days.

(21) Appl. No.: 11/023,634

(22) Filed: Dec. 29, 2004

(65) Prior Publication Data

US 2006/0033662 A1 Feb. 16, 2006

(30) Foreign Application Priority Data

Jul. 27, 2004 (GB) ................... 0416731.8

(51) Int. Cl.
G01S 5/04 (2006.01)
(52) U.S. Cl. .................... 342/465; 455/456.5
(58) Field of Classification Search ......... 342/450–452, 342/457; 455/456.1–457
See application file for complete search history.

(56) References Cited

U.S. PATENT DOCUMENTS

| | | | |
|---|---|---|---|
| 5,361,395 A * | 11/1994 | Yamamoto ................. 455/436 |
| 5,510,800 A * | 4/1996 | McEwan ................... 342/387 |
| 5,661,490 A * | 8/1997 | McEwan ................... 342/387 |
| 6,054,950 A * | 4/2000 | Fontana .................... 342/463 |
| 6,275,164 B1 * | 8/2001 | MacConnell et al. ....... 340/692 |
| 6,519,464 B1 * | 2/2003 | Santhoff et al. ......... 455/456.5 |
| 6,882,315 B2 * | 4/2005 | Richley et al. ............ 342/465 |
| 2001/0036832 A1 * | 11/2001 | McKay ................... 455/456 |
| 2003/0144011 A1 * | 7/2003 | Richards et al. .......... 455/456 |
| 2003/0176187 A1 * | 9/2003 | Menzel et al. .......... 455/432.1 |
| 2004/0002346 A1 * | 1/2004 | Santhoff ............... 455/456.1 |
| 2004/0108954 A1 * | 6/2004 | Richley et al. ............ 342/387 |
| 2004/0150560 A1 * | 8/2004 | Feng et al. ............... 342/465 |
| 2004/0192310 A1 * | 9/2004 | Karaoguz et al. .......... 455/440 |
| 2005/0215269 A1 * | 9/2005 | Cheok et al. ........... 455/456.1 |
| 2005/0255864 A1 * | 11/2005 | Kent et al. ............. 455/456.5 |
| 2006/0033662 A1 * | 2/2006 | Ward et al. ............... 342/465 |

* cited by examiner

*Primary Examiner*—Thomas G Black
*Assistant Examiner*—Shelley Chen
(74) *Attorney, Agent, or Firm*—Rothwell, Figg, Ernst & Manbeck, P.C.

(57) ABSTRACT

A portable location device for use in a location system, the device comprising a transmitter for transmitting ultra-wideband signals, a receiver for receiving non-ultra-wideband signals and a control unit coupled to the receiver for controlling the operation of the device in dependence on the received non-ultra-wideband signals.

20 Claims, 3 Drawing Sheets

LOCATION DEVICE AND SYSTEM USING UWB AND NON-UWB SIGNALS

BACKGROUND OF THE INVENTION

This invention relates to a location system for determining the position of an object in space and particularly to a location system which uses Ultra-Wideband (UWB) radio.

A typical location system determines the location of objects in three-dimensional space in relation to one or more reference points, whose location is known. If the relative location of an object is known in relation to sufficient reference points then the absolute location of the object may be determined.

FIG. 1 illustrates an array of reference points (A) having a known location and an object (B) whose location is unknown. The relative location of the object in relation to a reference point can be expressed in a multitude of ways. For example, the distance or bearing of the object from the reference point might be used. Once the relative location of the object is known in relation to a single reference point, the possible position of the object is restricted to being within a particular area of space. For example, in a three-dimensional system, if the object is located a distance X from a reference point, then the object must be located on the perimeter of a sphere centred at the reference point and having a radius X.

The possible location of the object can be further restricted by determining the relative location of the object in relation to other reference points. Although the relative location of the object in relation to a minimum number of reference points is required to determine the absolute location of an object (e.g. four for locating an object in three-dimensional space), in practice the absolute location of an object can often be determined using fewer reference points and discounting potential locations that are unrealistic.

The absolute location of an object may be determined in various ways depending on the known relationship between the object and the reference points. For example, well-known methods include triangulation (using relative distances and bearings) and trilateration (using relative distances).

One way to establish the relative location of the object is to transmit a signal between the object and a receiving device having a known location. For example, a suitable system can be based on "ultrawideband" (UWB) signals, which are short pulses of radiofrequency energy. In a location system using UWB technology, the distances and/or bearings are measured by sending UWB pulses, typically on the order of one nanosecond long, between the object to be located (or a marker attached to it) and the receiving device.

The distance between an object and a receiving device can be calculated by measuring the times-of-flight of the UWB pulses between the object and the receiving device. UWB signals are known to travel at the speed of light, therefore the distance between the object and the receiving device can be calculated from the time taken by a UWB pulse to travel between them. In order that the time-of-flight can be calculated, the object and the receiving device must have synchronised clock signals. However, the clocks of the object and the receiving device are unlikely to be exactly synchronised. Therefore, as the times involved are usually extremely short, any errors in the measurement of the time-of-flight will lead to the calculated distance being incorrect. As an alternative, the differences between the times-of-flight of the. UWB pulses received by two or more receiving devices can be determined, enabling differential distances ('pseudo-ranges') between the object and those devices to be calculated. This method does not require the object and the receiving devices to be synchronised, although the receiving devices must be synchronised with each other. It is not possible to determine the absolute distances involved in this way.

By detecting UWB radio pulses sent from one point using an array of detectors (typically separated by at most a few wavelengths of the centre frequency of the UWB signal) placed at another and measuring the relative properties of the signals received at each antenna (such as time-of-arrival or signal phase) it is possible to determine the bearing from which the signal was received and therefore the bearing of the object from the receiving device.

In indoor or cluttered environments, UWB location systems have significant advantages in accuracy over other forms of radiolocation system, which operate on similar principles but use much longer radio pulses or even continuous signals. If longer radio signals are employed, reflections of the signals from surfaces within the environment tend to disrupt measurement of received signal properties (say, the time at which the peak of the signal is detected) introducing errors into the measured distances, pseudo-ranges or bearings. In contrast, a UWB radio pulse is so short that the entire pulse can typically be processed by a receiver in isolation (and hence with good accuracy) before signal reflections arrive at the receiver, because those reflections must travel a longer path than the direct signal.

The theory of one UWB ranging system suitable for use in a location system is described in the paper "Ranging in a Dense Multipath Environment Using an UWB Radio Link", J-Y Lee and R. A Scholtz, IEEE Journal on Selected Areas in Communications, Vol. 20, No. 9, December 2002. A UWB signal is sent from one device to another and a signal is sent in response. This arrangement permits the round-trip-time of the signal from one device to another and back again to be determined and the distance between the devices can then be found by multiplying the round-trip-time by the speed of light and dividing by two. By repeating this process multiple times, with the device to be located communicating sequentially or simultaneously with several other devices placed at known points in space, the position of the first device can be determined. Typically, the UWB signals can also be coded to transfer data from one device to another. This data might include the identity of the device sending the signal, the identity of the device for which the signal was intended, and commands to modify the behaviour of the interacting devices, e.g. the rate at which each device transmits location-determination messages.

A disadvantage of this arrangement is that the object to be located (or the marker placed on it) must be capable of both transmitting and receiving UWB signals. UWB transmitters are typically quite simple devices, but UWB receivers are much more complex, and tend to be expensive and relatively power hungry (particularly when compared to traditional radio receivers). Therefore, the requirement for UWB-receive capability at the object to be located may well increase the cost of the system. Furthermore, because location systems are often used to determine the positions in space of mobile objects, which tend to have only battery power (rather than mains power) available to them, the additional power requirements of the UWB receiver at the mobile device may necessitate more frequent battery replacement or recharging, or a larger capacity battery, than would otherwise be desirable.

Systems in which the mobile object has the capability to both transmit and receive UWB signals are more flexible than those in which the mobile object only incorporates a UWB transmitter, because data can be conveyed to the mobile device over the UWB channel. However, systems of the first type are likely to be more expensive and power hungry than those of the second type, because they incorporate the added complexity of the UWB receiver.

Another implementation of a UWB location system is described in the paper "Commercialization of an Ultra Wideband Precision Asset Location System", R. J. Fontana, E. Richley, J. Barney, Proceedings of the 2003 IEEE Conference on Ultra Wideband Systems and Technologies, November 2003, Reston, Va. In this system, a tag capable of transmitting UWB signals is attached to the object to be tracked. The UWB signals emitted by the tag are detected by a set of synchronised UWB receivers placed at known points in the environment, which determine pseudoranges to the tag and can then calculate its 3D position. In this arrangement, the mobile tags use very little power, because they simply transmit a train of UWB pulses which encode the tag's unique identifier and then enter a low-power state until the next time they must transmit. The interval between UWB pulse train emissions is fixed, but typically might be one second.

Other UWB technologies exist which do not support coding of the emitted pulse train signal with identity information. The transmitted signal can be sent on one of a number of independent channels and receivers can be tuned to one of those channels. The receivers then ignore signals received on other channels. However, the number of distinct channels is very small (perhaps only ten or twenty) and therefore the channels can not be used directly in lieu of an identity in a location system for tracking very many objects. These technologies are unable, on their own, to support such a location system, because it would be impossible to determine which signals were transmitted from which device.

A further consideration in the use of UWB location systems is the regulatory environment surrounding UWB radio technology. At present, in the USA, UWB systems can be certified and used under two sets of rules, one applicable to systems which are to be used only indoors (FCC Rules, Section 15.517), and one applicable to 'hand-held' devices which may be used indoors or outdoors (FCC Rules, Section 15.518). Indoor-only systems are offered slightly relaxed emissions limits, because they can rely on some attenuation from building structure to minimise potential interference to other radio systems.

Each set of rules specifies restrictions to which UWB transmitters must adhere if they are to gain certification. For indoor systems, the technical design of the UWB transmitter must be such that it is incapable of being used outdoors. The rules state that having the UWB transmitter be powered from the mains supply is sufficient to demonstrate this. For 'hand-held' systems, the UWB transmitter must cease operation within ten seconds if it does not receive an indication that an associated receiver has detected its signal. Furthermore, 'hand-held' systems may not make use of fixed infrastructure involving UWB transmitters.

Bidirectional UWB systems such as the first described above could in principle be designed to meet the 'hand-held' requirements, because they are capable of receiving data from other objects in the environment, at the cost of having a UWB receiver on the mobile device. However, they could only receive that feedback from another mobile device, due to the restriction on the use of UWB infrastructure. This prohibition is particularly restrictive for location systems which naturally involve interaction between mobile devices and devices placed at known and normally fixed points in space. Furthermore, it is not clear how they could meet the requirements of the indoor rules unless they are mains powered, which would significantly reduce their applicability.

Unidirectional UWB systems, such as the second described above, cannot satisfy the requirements of the 'hand-held' rules, because they cannot receive feedback on whether or not their signals have been detected, and they can only satisfy the requirements of the indoor rules if they are mains powered, again significantly reducing their applicability.

This invention aims to address at least some of the limitations associated with current systems.

According to one embodiment of the present invention, there is provided a portable location device for use in a location system, the device comprising a transmitter for transmitting ultra-wideband signals, a receiver for receiving non-ultra-wideband signals and a control unit coupled to the receiver for controlling the operation of the device in dependence on the received non-ultra-wideband signals.

Preferably, the control unit is arranged to control the rate at which the ultra-wideband signals are transmitted in dependence on the received non-ultra-wideband signals. The control unit may be arranged to control the channel over which the ultra-wideband signals are transmitted in dependence on the received non-ultra-wideband signals. The control unit may also be arranged to control the channel over which the non-ultra-wideband signals are received in dependence on the received non-ultra-wideband signals.

Preferably, the transmitter is arranged to transmit the ultra-wideband signals periodically and the control unit is arranged to stop the transmitter from transmitting those periodic ultra-wideband signals until a non-ultra-wideband signal of a predetermined type is received by the receiver.

The control unit may be arranged to start the transmitter transmitting the ultra-wideband signals when the receiver receives a non-ultra-wideband signal of a predetermined type.

Preferably, the ultra-wideband signals are suitable for allowing the location of the portable location device to be calculated. The ultra-wideband signals may be radio signals. The non-ultra-wideband signals may also be radio signals.

The transmitter may also be capable of transmitting non-ultra-wideband signals. The transmitter may also be capable of transmitting non-ultra-wideband signals containing an identifier that identifies the portable location device.

Preferably, the location device is arranged to periodically transmit an ultra-wideband signal and to transmit a non-ultra-wideband signal containing the identifier within a predetermined time of the transmission of the ultra-wideband signal. The predetermined time may be in a range from any of 0, 1, 2 or 5 seconds to any of 6, 10, 12 or 15 seconds.

According to a second aspect of the present invention, there is provided a location system comprising a plurality of receivers for receiving ultra-wideband signals from a portable device, a location unit for determining the location of the portable device in dependence on the ultra-wideband signals received by the receiver and a transmitter for transmitting control signals to the portable device in the form of non-ultra-wideband signals.

Preferably, the transmitter is arranged to periodically transmit the non-ultra-wideband signals. The transmitter may be arranged to broadcast or multicast the non-ultra-wideband signals to a plurality of portable devices. The transmitter may be arranged to transmit a non-ultra-wideband signal directed to a specific portable device in response to receiving a non-ultra-wideband signal from that device.

Preferably, the receiver is capable of receiving non-ultra-wideband signals.

Preferably, the location unit is arranged to attribute an ultra-wideband signal received at the receiver as being from a specific portable device in response to receiving a non-ultrawideband signal identifying that device within a predetermined time of receiving the ultra-wideband signal.

The location reference device may comprise a handover unit, the handover unit being arranged to determine when handover of a tag from the location reference device to another location reference device is required and the transmitter being arranged to transmit a non-ultra-wideband signal indicating that handover is required to that tag if the handover unit determines that handover is required.

According to a third aspect of the present invention, there is provided a location system and a portable location device, the location system comprising a plurality of receivers for receiving ultra-wideband signals and a transmitter for transmitting non-ultra-wideband signals and the portable location device comprising a transmitter for transmitting ultra-wideband signals, a receiver for receiving non-ultra-wideband signals and a control unit coupled to the receiver for controlling the operation of the device in dependence on the received non-ultra-wideband signals.

Preferably, the location reference device comprises a location unit for determining the location of the portable location device in dependence on ultra-wideband signals received from the transmitter of the portable location device at least some of the receivers of the location system.

The transmitter of the location system may be arranged to periodically transmit non-ultra-wideband signals for reception at a receiver of the portable location device.

The receiver of the location system may be capable of receiving non-ultra-wideband signals and the transmitter of the portable location device may be capable of transmitting non-ultra-wideband signals.

Preferably, the location system comprises a plurality of base stations each comprising one of the receivers and a handover unit, the handover unit being arranged to determine when handover of the portable location device from one of the base stations to another base station is to be performed and the system is arranged so that when such a determination is made the transmitter of the location system transmits a non-ultra-wideband handover signal to the portable location device, and the control unit of the portable location device is arranged to change the channel on which it transmits ultra-wideband signals in response to reception of the handover signal by the receiver of the device.

DESCRIPTION OF THE DRAWINGS

The present invention will be described by way of example, with reference to the accompanying drawings, in which.

DETAILED DESCRIPTION OF THE INVENTION

Figure 1:
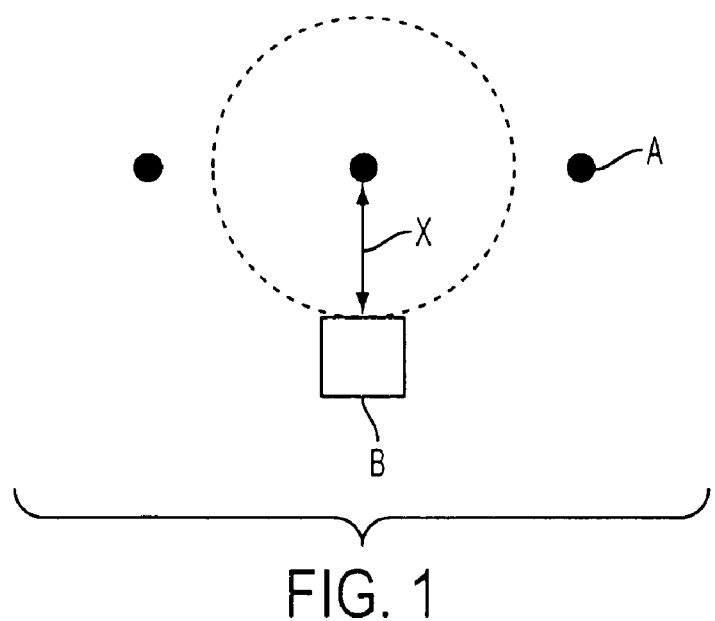
FIG. 1 illustrates an object in relation to known reference points.

According to an embodiment of the present invention, objects within a location system can be located by attaching a tag, or marker, to each object. Preferably, the tags are small, lightweight and portable. Each tag comprises a transmitter and a receiver for communicating with one or more base stations at known points in the environment. For example, the system in FIG. 1, the base stations are placed at the known reference points and the tag is the object having an unknown location.

The tags are equipped with a transmitter capable of emitting UWB signals for the purpose of location determination and a conventional radio receiver capable of receiving data messages from one or more of the base stations. Base stations consist of a receiver capable of detecting UWB signals from the tags. The location system also involves at least one conventional radio transmitter placed within the environment which is capable of sending data to the tags. Typically, one or more of the base stations include the conventional radio transmitter.

UWB technology is different from conventional narrowband wireless transmission technology. Instead of broadcasting on separate frequencies, UWB spreads signals across a very wide range of frequencies. UWB signals have very low power, which means that UWB transmissions can appear as background noise. Therefore, UWB signals are exempt from some of the regulatory controls that generally restrict signal transmission.

One currently accepted definition of a UWB signal is a signal having either or both of the following qualities:
1. a fractional bandwidth greater than or to equal 0.02; or
2. a UWB bandwidth greater than or equal to 500 MHz.

The UWB bandwidth is the frequency band bounded by the frequencies at which the signal power is 10 dB below highest signal power. If the upper and lower boundaries of the UWB bandwidth are $f_H$ and $f_L$ respectively, then the fractional bandwidth is equal to $2(f_H-f_M)/(f_H+f_M)$.

By employing mobile tags which can transmit UWB signals but which can also receive data messages over a conventional radio link, the system gains the accuracy advantage of UWB, whilst also retaining the low power and cost advantages of conventional radio technology. It is also possible to configure the system so that tags can use the conventional radio link to meet regulations controlling the use of UWB technology.

With this system it is possible to send commands from the infrastructure's conventional radio transmitter, to control the behaviour of the tags, without incurring a cost penalty due to the use of a UWB receiver on the tag. Depending on the protocols used over the conventional radio link, data commands can be broadcast (directed at all mobile tags), multicast (i.e. directed at a subset of all tags) or unicast (directed at a particular tag). The data contained in the message may be used for several purposes, for example:

The data command may indicate to one or more tags that they should change the rate at which they transmit location-determining signals, e.g. based on the location system's assessment of their current rate of motion and the relative importance of current location information for each tag.

If either the conventional or UWB radio technologies employed by the system support multiple orthogonal channels, the data command may indicate to one or more tags that they should subsequently receive conventional radio messages, or transmit UWB signals, on a different channel to the one they are currently using. This feature permits 'handover' of control of a tag between neighbouring radio cells which use orthogonal radio channels.

These purposes are given for the purposes of example only and it should be understood that the data contained in the message may indicate any appropriate command, or contain any appropriate information, for the tag.

The infrastructure's conventional radio transmitter(s) can be programmed to periodically respond to receiving a UWB signal at a base station, which a base station has been able to ascribe to a particular tag, by transmitting one or more broadcast or directed data messages in response to the received signal. A suitable period might be ten seconds, for example. The message indicates to the tag that transmitted the UWB original signal that its signal was detected. By programming the tag to cease continual UWB transmissions unless it receives a data message confirming continued receipt of those transmissions over the conventional radio link, the system can be made compliant with regulations such as the US 'handheld' device rules detailed previously. The location system can therefore satisfy the requirements for cessation of UWB transmissions, without the tags having to include UWB receivers.

The infrastructure's conventional radio transmitter(s) may also be programmed to send out a periodic hailing message. If the location system is installed in a building, then the output power of the transmitter(s) is adjusted to ensure that the level of the signal outside the building is below the sensitivity level of the conventional radio receivers on the mobile tags. The mobile tags are programmed not to transmit UWB signals unless they can detect the presence of the surrounding infrastructure by checking for receipt of the hailing signal via the conventional radio channel. Therefore, the tag will not transmit UWB signals outside of the building in which the location system is installed and the location system is able to advantage of any relaxed regulations concerning indoor-only UWB systems.

In a further aspect of the proposed location system, each tag is equipped with a UWB transmitter and a conventional radio transceiver and each base station is equipped with a UWB receiver and a conventional radio transceiver. Tags in such a system can both receive messages from and send messages to the associated infrastructure components via the conventional radio link. This arrangement has the advantage that it is possible to track many tags in the location system. The system can employ UWB technology, which is not capable of coding the identity of the transmitting tag in the UWB signal emitted by a tag, whilst still allowing base stations to identify tags within the system. The tag simultaneously transmits its identifier on the conventional radio channel together with an uncoded UWB signal. A base station receiving a UWB signal can ascribe it to the correct tag by associating that signal with the conventional radio message which it will receive at the same time.

Figure 2:
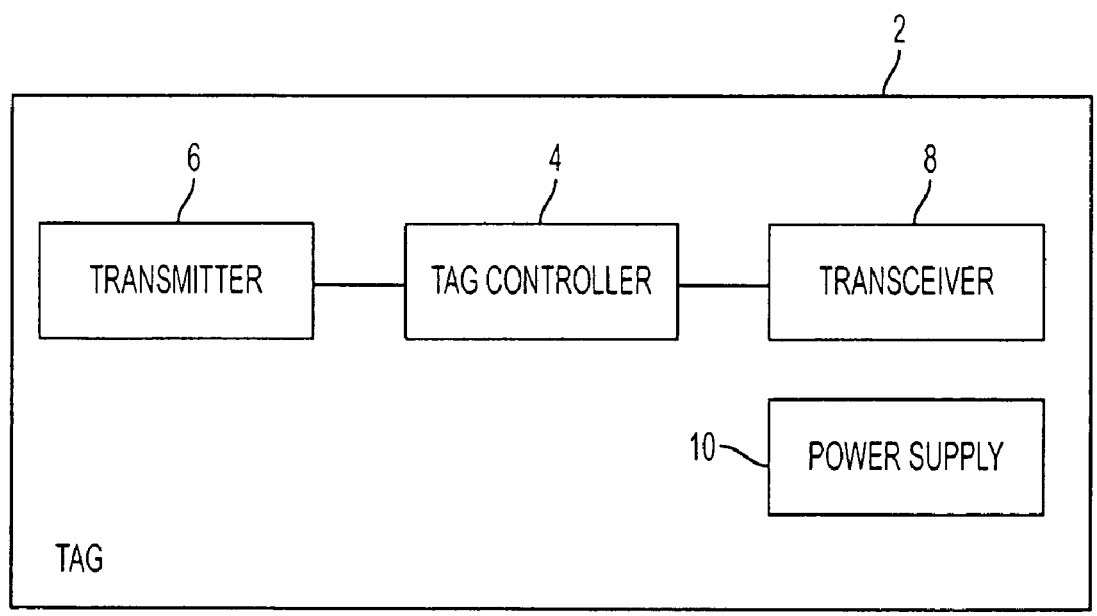
FIG. 2 illustrates a tag suitable for use in a location system.
Figure 3:
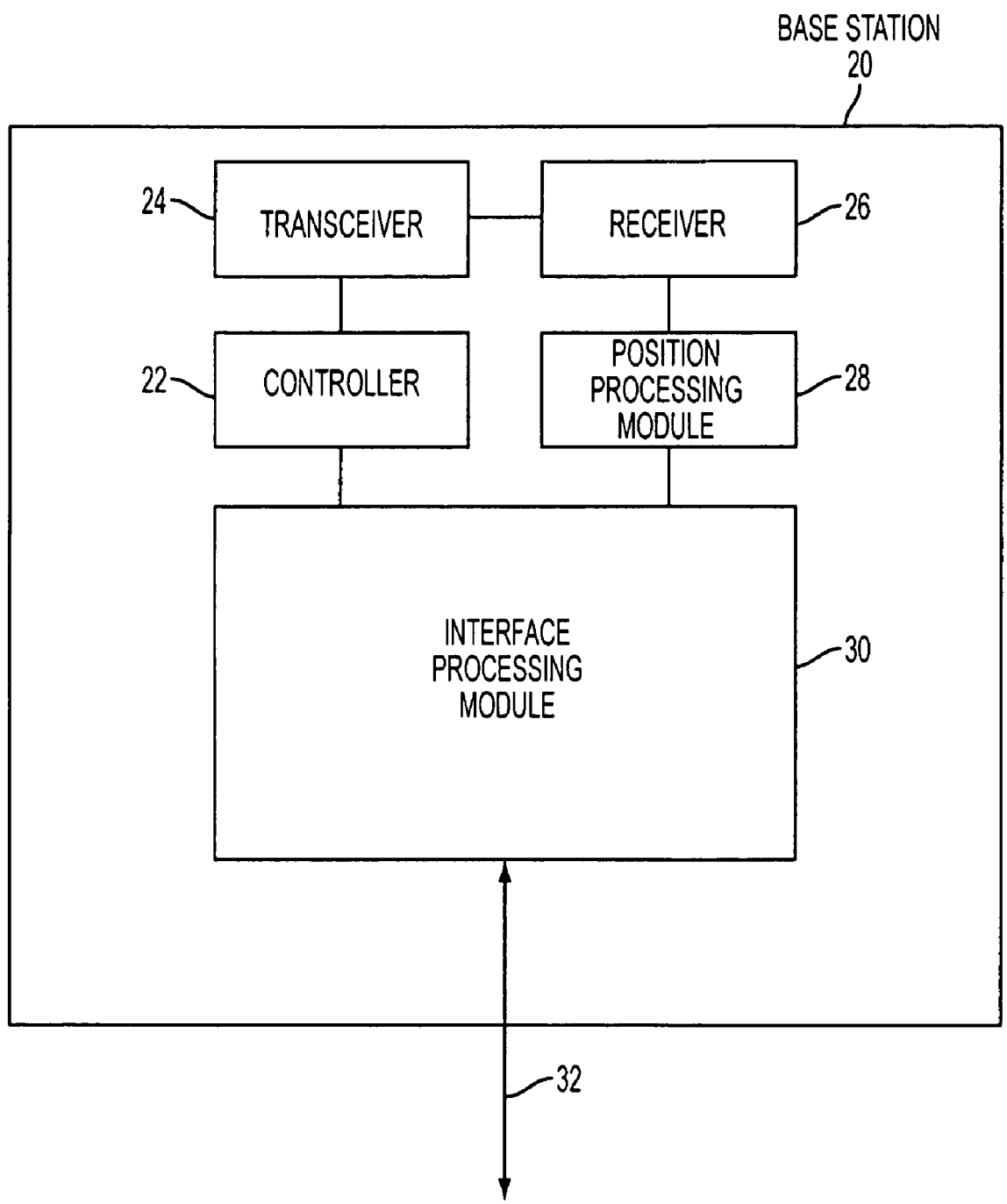
FIG. 3 illustrates a base station suitable for use in a location system.

A tag suitable for use in the location system is illustrated in FIG. 2. The tag (2) comprises a tag controller (4), for example a PIC16LF877A microcontroller made by Microchip Inc., a UWB transmitter (6) and a conventional radio transceiver (8), such as the CC1020 made by Chipcon S. A. Each tag has a unique 32-bit identifier and a battery-derived power supply (10). The tag controller (4) controls the settings on the radio transceiver (8), decodes signals detected by that transceiver and its control program features a state machine which determines the behaviour of the tag. A base station suitable for use in the location system is illustrated in FIG. 3. The base station (20) comprises a base station controller (22), for example the PIC16LF877A microcontroller made by Microchip Inc., a conventional radio transceiver (24), such as the CC1020 made by Chipcon S. A., a UWB receiver (26), a position processing module (28), such as the DSPBlok21161 made by Danville Signal Processing Limited and an interface processing module (30), such as the FS20 made by Forth Systems GmbH. The UWB receiver (26) can determine the time-of-arrival of an incoming UWB signal and can generate bearings in azimuth and elevation indicating the direction of the source of the incoming UWB signal. The base station controller (22) controls the settings on the radio transceiver and decodes signals detected by that transceiver.

Figure 4:
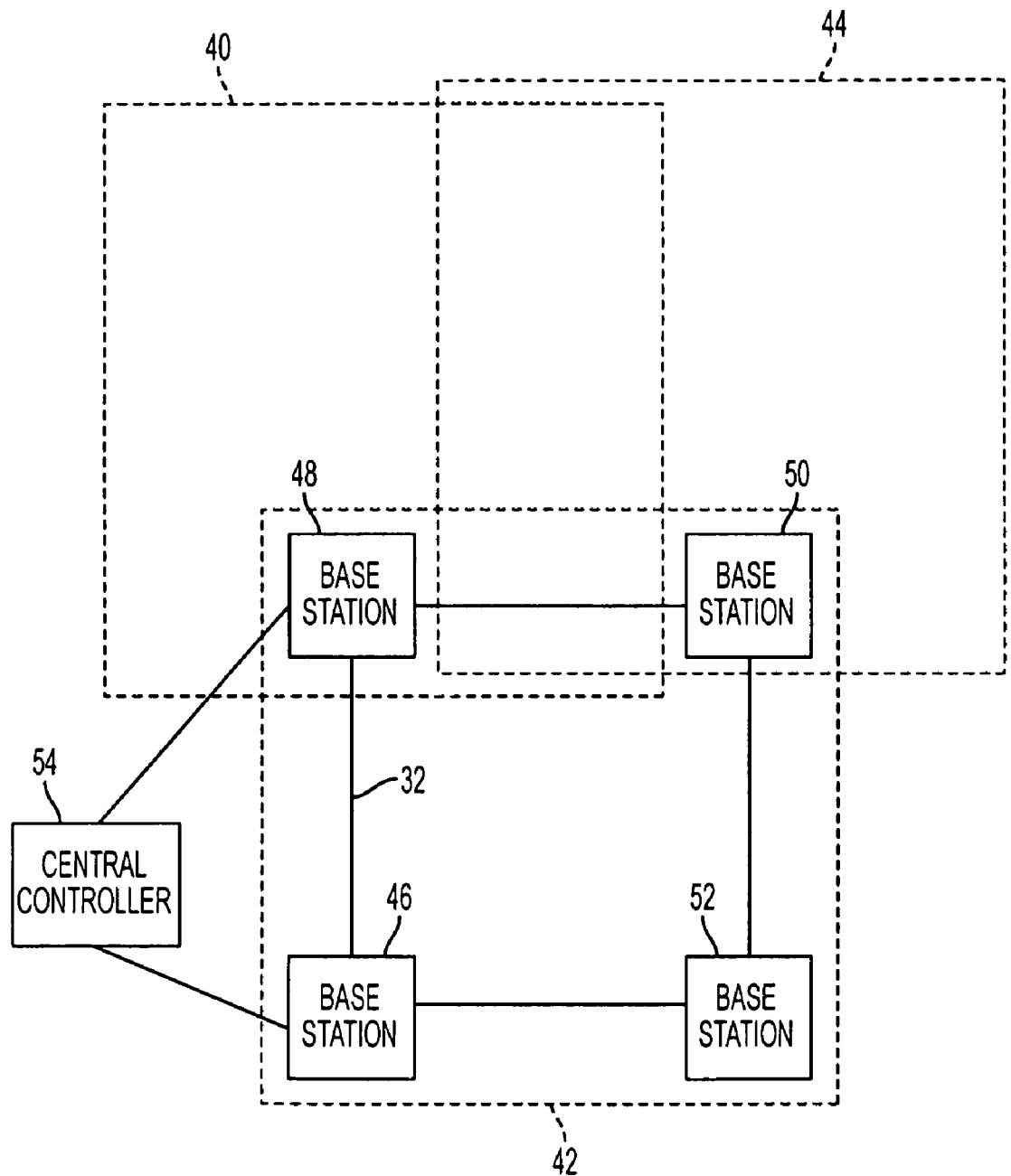
FIG. 4 illustrates a location system.

The organization of the location system is illustrated in FIG. 4. The location system comprises a set of cells (40,42, 44), each of which uses four base stations (46,48,50,52), to provide coverage of an area of space. Each cell might typically cover an area of 15 m×15 m. However, each cell could be larger or smaller than this example and need not be square.

A central controller (54) consisting, for example, of a networked PC controls the overall operation of the location system. The central controller (54) and all base stations are connected via a network (32), such as a standard Ethernet network. Control messages are sent by the central controller to the base stations within a cell over the network. The module (30) of each base station is connected to the network (32) and acts as the network interface for the base station.

The network shown in FIG. 4 is a wired network. However, the base stations could alternatively be connected via a wireless network. The base stations are synchronised over the network so that the tag need not be synchronised with the base stations, as described earlier.

The conventional radio technology used in the location system may be capable of being tuned to one of ten channels and might typically operate over the 902-928 MHz band.

However, the system is not limited to using ten conventional channels. Other frequency bands may also be used. The UWB radio technology used in the location system is typically capable of transmission on one of ten orthogonal channels. Again the system could operate using more, or fewer, than ten UWB channels. There is a known mapping between conventional and UWB radio channels. Each cell in the location system uses one conventional radio channel and its associated UWB channel and base stations within that cell are programmed to use those channels for communication. Neighbouring cells in the location system are allocated to different radio channels, so that the transmissions within one cell are not detected by neighbouring cells.

In the normal operation of a cell, one base station is designated the 'master' base station and acts as the sole transmitter of conventional radio messages sent from the infrastructure to tags within that cell. All the base stations within a cell are capable of receiving conventional radio messages and UWB signals from tags within that cell. After the messages have been received and processed, results from base stations within a cell are passed over the network (32) to the master base station for collation and processing. The strength of the conventional radio signal emitted by the master base station can be adjusted by the central controller. The signal control message is sent to the relevant master base station over the network (32). When the signal control message is received at the base station by the interface processor module (30) the message is passed on to the radio transceiver (24) via the base station controller (22).

A timeslot structure is imposed on the conventional and UWB channels within a cell. Timeslots are 25 ms long. During each timeslot, a message can be sent from the master base station to tags within the cell over the conventional radio link and there are two opportunities for tags in the cell to send a message to base stations over the conventional radio link. A tag can also send a UWB signal in the timeslot for reception by the base stations within the cell.

When a tag is switched on for the first time, it enters a searching state and assesses the strength of signals on all conventional radio channels, attempting to receive messages on the channel with the strongest signal (thereby attempting to begin communications with the most local cell). In the searching state, the tag is prevented from emitting UWB signals. Subsequently, if a tag which is not in the searching state fails to receive a conventional radio message on the channel to which it is tuned, it re-enters the searching state. Therefore, in the case of an in-building system, if it is arranged that the conventional radio signal strength emitted by each master base station is such that conventional radio emissions from those base stations are below the tag's threshold of detection at points outside the building, then the tag cannot emit UWB signals outside the building. This arrangement can therefore be used to meet requirements of regulations prohibiting outdoor emissions of UWB signals.

Once the tag has established communications with the local cell, it is able to send UWB positioning signals. When a particular tag sends a UWB transmission in a timeslot, it also transmits a message containing its unique identifier over the conventional radio channel. The UWB receiver (26) of a base station (20) detects the positioning signal and passes it to the position processing module (28) for extraction of time-of-arrival and azimuth/elevation bearings. The conventional radio transceiver (24) of the base station detects the message containing identification information and passes the signals on for decoding by the base station controller (22). The information gathered by the base station from the signals on the UWB and conventional radio channels is passed by the position processing module (28) and the controller (22) to the base station's interface processing module (30) and from there it is sent to the master base station over the network (32).

After the master base station has collected all the information relevant to a particular timeslot, its interface processing module (30) sends the information to the master base station's position processing module (28), which attempts to use readings from multiple base stations and the known base station positions and orientations, to compute a 3D position for the tag. If the computation is successful, the position and tag identification information is passed back to the master base station's interface processing module (30), which transmits them over the network (32) to the central controller (54).

When the central controller (54) detects that a tag is communicating with one cell but would be better served by another cell, it sends a message to the tag indicating that a handover of control should take place from one cell to another. The message also contains details of the conventional radio channel used by the destination cell, so that the tag can retune its local conventional radio transceiver appropriately. The central controller assessment of which cell is most appropriate for a tag at any time can be based on a number of criteria, including strength of the UWB signal from that tag received by base stations of the current cell, strength of the conventional radio signal from that tag received by base stations of the current cell and comparison of the physical position of the tag (as determined by the location system) with the known extents of each cell, which are stored in a database in the central controller (54).

In one configuration of the system, tags will not transmit UWB positioning signals in a timeslot unless commanded to do so by the message that the relevant master base station sent in that timeslot. The master base station for a cell can then change the rates at which tags transmit UWB signals by varying the number of command messages it sends to each tag per unit time. The master base station may make these changes in response to commands sent over the network (32) by the central controller (54). The central controller may generate these commands in response to application demands, the current state of the environment etc.

In a system governed by a command-response protocol of this nature, there must exist mechanisms for informing the master base station of a cell of new tag arrivals to the cell and of tag departures from the cell. These mechanisms can be implemented using the bidirectional messaging facilities of the conventional radio link between master base stations and tags. However, it is important to note that the command-response mechanism enables a system of this kind to meet regulations stipulating that tags should cease transmission of UWB signals within some period of time if they cannot be detected by an associated receiver. For example, if the master base station repeatedly commands a particular tag to transmit a UWB signal, but receives no indication (either directly, or via the slave base stations in that cell) that the signal has been detected, it can stop commanding the tag to transmit a UWB signal, meeting the requirements of the regulation.

In an alternative implementation to that described above, the three-dimensional location of the tag could be calculated by the tag rather than the base station. This requires the time difference between the reception at the tag of signals transmitted by different base stations to be measured. The base stations would again be synchronised with each other, so that the signals are either transmitted at a single given instant or at a given time interval from each other. The tag would be programmed either to treat the signals as having been transmitted at the same time instant, or to treat them as having been transmitted at a given time interval from each other. The tag would also require data as to the location of each of the base stations, in order to calculate its own position. Preferably, the signals transmitted to the tag would identify the base station from which they had been transmitted. Once the tag had calculated its position, it could transfer it to the central controller as before.

By means of the location system described above the central controller, or an alternative system, may track objects and people within a particular environment and use that information to direct resources accordingly. For example, the system could be used in hospitals to page the nearest appropriate doctor to a patient during an emergency.

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the present invention may consist of any such feature or combination of features. In view of the foregoing description it will be evident to a person skilled in the art that various modifications may be made within the scope of the invention.

The invention claimed is:

1. A location system and a portable location device, the portable location device comprising:
   a first transmitter arranged to transmit ultra-wideband signals to the location system;
   a receiver for receiving the non-ultra-wideband control signals from the location system; and
   a control unit coupled to the receiver and arranged to control the transmission by the first transmitter of ultra-wideband signals in dependence on the non-ultra-wideband control signals received at the portable location device; and
   the location system comprising:
   a plurality of receivers for receiving the ultra-wideband signals from the portable device;
   a second transmitter arranged to transmit the non-ultra-wideband control signals to the portable device; and
   a location unit configured to determine the location of the portable location device by controlling the second transmitter to transmit the non-ultra-wideband control signals to the portable device and by using information derived from the ultra-wideband signals received from the first transmitter of the portable location device at more than one of the receivers of the location system.

2. A location system and a portable location device as claimed in claim 1, wherein the second transmitter of the location system is arranged to periodically transmit non-ultra-wideband signals for reception at the receiver of the portable location device.

3. A location system and a portable location device as claimed in claim 1, wherein the location system comprises a plurality of base stations each comprising one of the plurality of receivers and a handover unit, the handover unit being arranged to determine when handover of the portable location device from one of the base stations to another base station is to be performed and the system is arranged so that when such a determination is made the second transmitter of the location system transmits a non-ultra-wideband handover signal to the portable location device, and the control unit of the portable location device is arranged to change the channel on which it transmits ultra-wideband signals in response to reception of the handover signal by the receiver of the device.

4. A location system and a portable location device as claimed in claim 1, wherein the second transmitter is arranged to broadcast or multicast the non-ultra-wideband signals to a plurality of portable devices.

5. A location system and a portable location device as claimed in claim 1, wherein the first transmitter is operable to transmit non-ultra-wideband signals.

6. A location system and a portable location device as claimed in claim 5, wherein the first transmitter is operable to transmit non-ultra-wideband signals containing an identifier that identifies the portable location device.

7. A location system and a portable location device as claimed in claim 6, wherein the location device is arranged to transmit a non-ultra-wideband signal containing the identifier within a predetermined time of transmitting an ultra-wideband signal.

8. A location system and a portable location device as claimed in claim 7, wherein one or more receivers of the location system are capable of receiving non-ultra-wideband signals and the location unit is arranged to attribute an ultra-wideband signal received at a receiver of the location system as being from a specific portable device in response to receiving a non-ultra-wideband signal identifying that device within a predetermined time of receiving the ultra-wideband signal.

9. A location system and a portable location device as claimed in claim 1, wherein the location system comprises a plurality of location reference devices each including a handover unit operable to determine when handover of a portable location device from a first location reference device to a second location reference device is required.

10. A location system and a portable location device as claimed in claim 9, wherein the second transmitter is arranged to transmit a non-ultra-wideband signal to the portable location device indicating that handover to the second location reference device is required if the handover unit of the first location reference device determines that such handover is required.

11. A location system and a portable location device as claimed in claim 1, wherein the control unit is arranged to control the rate at which the ultra-wideband signals are transmitted in dependence on the received non-ultra-wideband signals.

12. A location system and a portable location device as claimed in claim 1, wherein the control unit is arranged to control the channel over which the ultra-wideband signals are transmitted in dependence on the received non-ultra-wideband signals.

13. A location system and a portable location device as claimed in claim 1, wherein the control unit is arranged to stop the first transmitter from transmitting ultra-wideband signals until a non-ultra-wideband signal of a predetermined type is received at the receiver of the portable location device.

14. A location system and a portable location device as claimed in claim 13, wherein the first transmitter is arranged to transmit periodic ultra-wideband signals.

15. A location system and a portable location device as claimed in claim 1, wherein the control unit is arranged to start the first transmitter transmitting ultra-wideband signals when the receiver of the portable location device receives a non-ultra-wideband signal of a predetermined type.

16. A location system and a portable location device as claimed in claim 1, wherein the ultra-wideband signals are suitable for allowing the location of the portable location device to be calculated.

17. A location system and a portable location device as claimed in claim 1, wherein the ultra-wideband signals are radio signals.

18. A location system and a portable location device as claimed in claim 1, wherein the non-ultra-wideband signals are radio signals.

19. A location system and a portable device as claimed in claim 7, wherein the control unit of the location device is arranged to control operation of the first transmitter in dependence on the received non-ultra-wideband control signals to transmit a non-ultra-wideband signal containing the identifier within a predetermined time of transmitting an ultra-wideband signal.

20. A location system and a portable location device as claimed in claim 19, wherein the first transmitter is arranged to periodically transmit ultra-wideband signals to the location system.

* * * * *